Oct. 23, 1923.

G. W. WEIFORD, JR 1,471,432

DEVICE FOR TESTING ELECTRIC CIRCUITS

Filed Nov. 12, 1921  2 Sheets-Sheet 1

Inventor

GEORGE W. WEIFORD, JR.

By A. V. [signature]

Attorney

Oct. 23, 1923.
G. W. WEIFORD, JR
1,471,432
DEVICE FOR TESTING ELECTRIC CIRCUITS
Filed Nov. 12, 1921
2 Sheets-Sheet 2
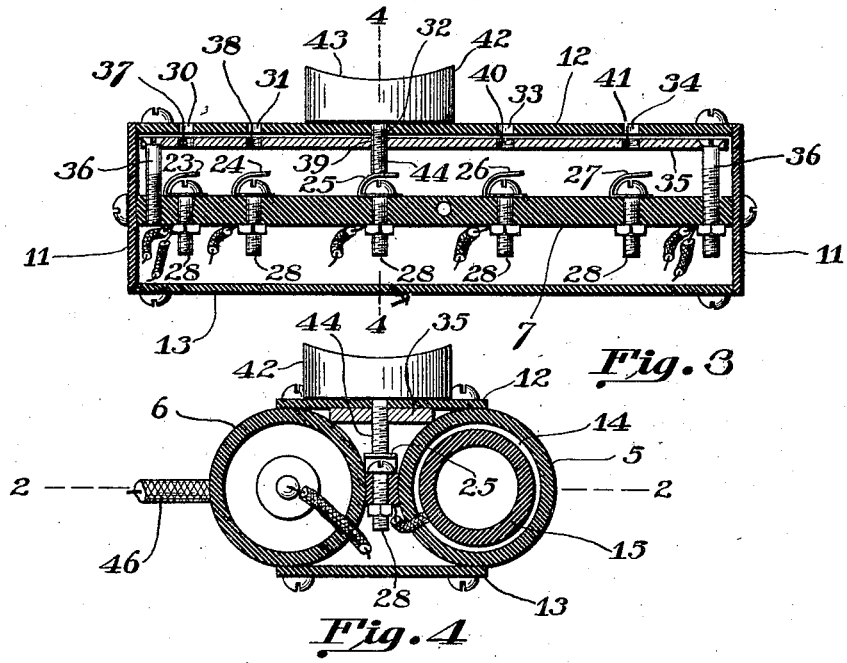
Fig. 3
Fig. 4
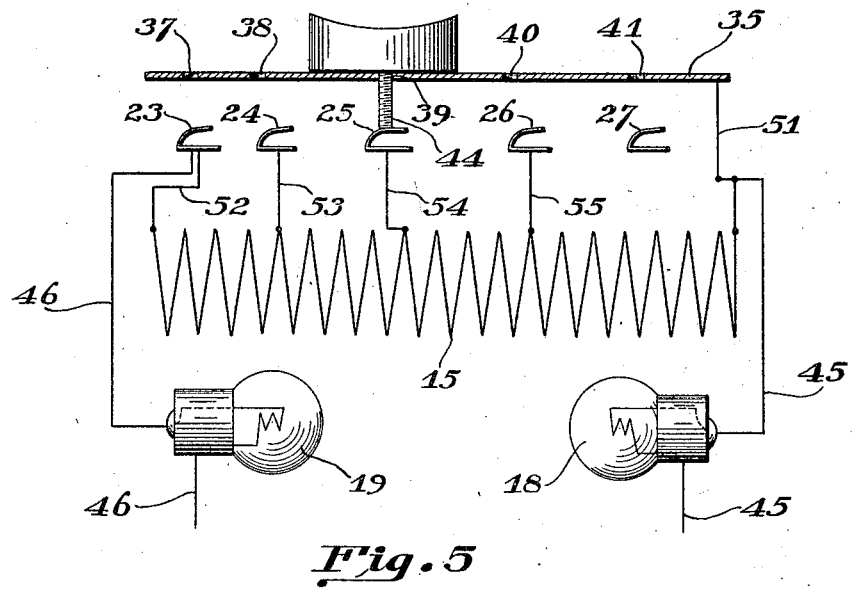
Fig. 5
Inventor
GEORGE W. WEIFORD, JR.
By [signature]
Attorney Patented Oct. 23, 1923.

1,471,432

UNITED STATES PATENT OFFICE.

GEORGE W. WEIFORD, JR., OF PHILADELPHIA, PENNSYLVANIA.

DEVICE FOR TESTING ELECTRIC CIRCUITS.

Application filed November 12, 1921. Serial No. 514,640.

*To all whom it may concern:*

Be it known that I, GEORGE W. WEIFORD, Jr., a citizen of the United States, residing at Philadelphia, in the county of Philadelphia and State of Pennsylvania, have invented certain new and useful Improvements in Devices for Testing Electric Circuits, of which the following is a specification.

The object of this invention is to provide a strong and durable electric-circuit testing device of novel, simple and efficient construction for determining the condition of a circuit, whether live or dead, or of a fuse, whether good or blown, and for determining more complicated troubles.

The invention employs a strong and durable casing containing and protecting the testing elements and having two testing terminals or leads extending therefrom and adapted to be applied to a circuit on the respective sides of the part thereof to be tested, and a connecting plug adapted to be set in different positions on the casing to set the device in the proper condition for testing circuits of many different voltages.

The invention aims to provide a device having a testing lamp or lamps within and protected by the casing which will burn at the same candle power on any one of many voltages which the device may be set to receive, to avoid all danger incident to lamp explosions, and which will not be injured even under rough usage when in service.

The invention consists in the novel construction, combination and arrangement of parts hereinafter described and claimed.

Figure 1:
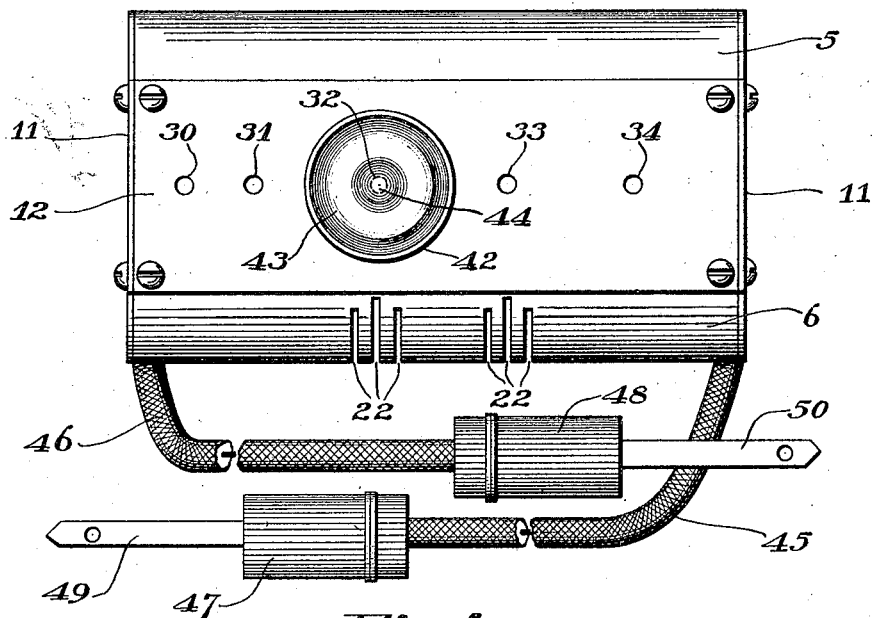

In the accompanying drawings, illustrating the invention,

Figure 1 is a top view of my improved testing device.

Figure 2:
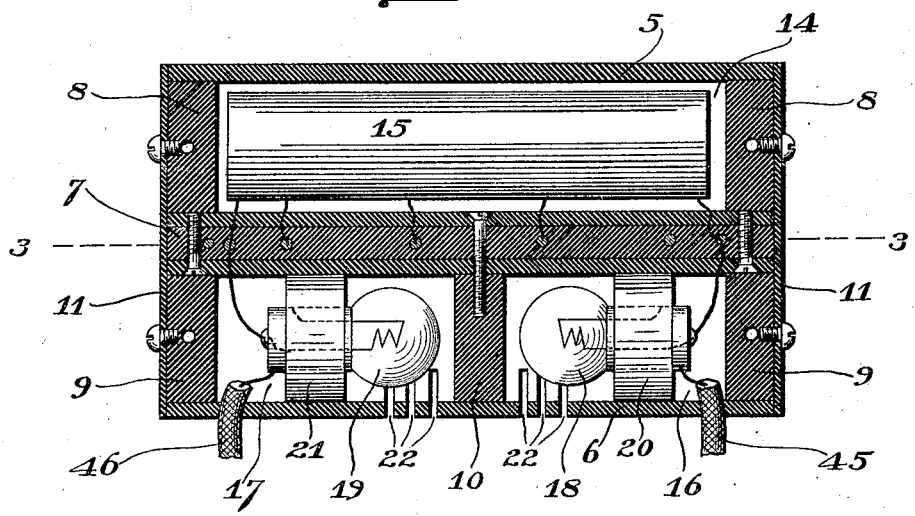

Figures 2, 3 and 4 are sections through the device on lines 2—2, 3—3 and 4—4, of Figs. 4, 2 and 3, respectively.

Figure 5 is a diagrammatic view showing the electrical connections of the device.

Referring to the drawings, the casing of the device comprises two parallel cylindrical members 5 and 6, a centrally-arranged, longitudinally-extending bar or member 7 between the members 5 and 6, end heads 8 and 9 within and closing the ends of the cylindrical members 5 and 6, respectively, a central partition wall 10 within the member 6, end plates 11, and top and bottom plates 12 and 13. All these parts are formed of suitable strong and durable electrical insulating material such as fibre, hard rubber or the substance well known as "bakelite", and all the parts are secured firmly together by suitable screws, as shown in the drawings.

The cylindrical member 5 encloses a chamber 14 containing a suitably constructed resistance coil 15. The member 6 encloses two chambers 16 and 17 separated by the partition wall 10, and these chambers contain two incandescent testing lamps 18 and 19. The lamps 18 and 19 extend through and are supported by sleeves or collars 20 and 21 which are fitted to the interior of the cylindrical member 6; and the member 6 is provided with slots or openings 22 through which the light from the lamps 18 and 19 may be seen.

The central wall or member 7 of the casing supports a plurality of contact parts 23, 24, 25, 26 and 27, each comprising a plate secured to the wall 7 by a screw 28 and a yielding arm extending over the screw, as clearly shown in Figs. 3 and 4. The contact plates 23, 24, 25, 26 and 27 are arranged directly beneath holes or openings 30, 31, 32, 33 and 34, respectively, in the top plate or wall 12 of the casing.

Interposed between the walls 7 and 12 is a plate 35 of electrical conducting material having its longitudinal edges resting on the cylindrical members 5 and 6 and held in place by screws 36. The plate 35 is provided with screw-threaded holes 37, 38, 39, 40 and 41 which are arranged between and in alinement with the contact parts 23, 24, 25, 26 and 27 and the holes or openings 30, 31, 32, 33 and 34 in the top wall 12 of the casing. A plug 42 is provided having a head 43 of insulating material and a screw-threaded stem 44 of electrical conducting material adapted to be inserted into any one of the holes 30, 31, 32, 33 and 34 and screwed into and through the hole in the plate 35 alined therewith and into engagement with the spring contact arm beneath the same, and thus electrically connect the plate 35 and the contact plate beneath the hole in the wall 12 into which the plug 42 is inserted, for a purpose hereinafter explained.

Extending from the interior of the chambers 16 and 17 of the casing to the exterior thereof through openings in the wall of the casing member 6 are two terminal electrical conductors or lead wires 45 and 46 which may be of any suitable length. The inner portions of these lead wires are connected to the parts of the device within the casing, as will presently appear, and the outer or free ends of the wires are provided with heads 47 and 48 carrying contact blades or projections 49 and 50 to which the wires 45 and 46 are connected and which are adapted to be applied to an electric circuit at two spaced points, so that the current of the circuit will be shunted through the elements of the testing device.

I shall now describe the electrical connections of the parts of the device contained within the casing:

The lead conductor 45 is connected to and extends from one end of the resistance coil 15 and it extends through or includes the lamp 18 between the coil 15 and its contact blade 49. The lead conductor 46 is connected to and extends from the contact part 23 and it extends through or includes the lamp 19 between the contact part 23 and the contact blade 50. The end of the resistance coil 15 connected to the wire 45 is also connected to the current conducting plate 35 through the wire 45 and a wire 51 connecting it to the plate 35; and the other end of the coil 15 is connected to the contact part 23 by a wire 52. The contact parts 24, 25 and 26 are connected to the resistance coil 15, intermediate of the ends thereof and at different distances from the end of the coil which is connected to the lead wire 45, by wires 53, 54 and 55, respectively, as shown in Fig. 5. The contact part 27 has no electrical function and is provided merely for a yielding abutment for the stem 44 of the plug 42 when it is inserted into the hole 34 and screwed through the plate 35 and down upon the casing wall 12.

It will now be understood that when the plug 42 is set in contact with the part 23 and the contact blades 49 and 50 are applied to an electric circuit, the current will flow through the lead wire 45 and its lamp 18, the wire 51, the plate 35, the plug 42, the contact part 23 and the lead wire 46 and its lamp 19, and will not flow through any part of the resistance coil 15. It will also be understood that when the plug 42 is set in contact with the part 27 the current will flow through the entire resistance coil 15, and that when the plug 42 is set in contact with any one of the parts 24, 25 and 26, the current will flow through only a portion of the coil 15 which is determined by the distance between the wire connecting the particular contact part with the coil and the end of the coil connected to the lead wire 46.

The purpose of providing a plurality of contact parts connected to the coil 15 at different distances from the end thereof connected to the part 23 and lead wire 46 is to cause the lamps 18 and 19 to burn at the same candle power when the testing device is applied to circuits of different voltages, and the plug 42 is set to include all of the coil 15 or no part of the coil or sufficient thereof for the voltage of the circuit to which the device is applied.

As herein illustrated, provision is made for five different voltages. These may be increased or decreased as desired by increasing or decreasing the number of points where the current may enter the coil 15 between the ends thereof. Also the different voltages represented by the coil 15 between the tap wires leading therefrom and the lamp 19 may be greatly varied by constructing the coil in accordance with the voltages desired, as will be readily understood by persons skilled in this art.

As herein illustrated, the device has a voltage range which includes all commercial low potentials, so that when the plug 42 is set in the different holes or openings 30, 31, 32, 33 and 34, there will be sufficient resistance in the device to cause the lamps 18 and 19 to burn at the same candle power on circuits of 40 volts, 110 volts, 220 volts, 440 volts and 600 volts, respectively, in accordance with the position of the plug 42. These voltages are printed or stamped upon the top wall or plate 12 of the casing adjacent to the holes or openings 30, 31, 32, 33 and 34, respectively, as shown in Fig. 1.

When it is desired to use the testing device on a circuit of any one of the five voltages hereinbefore referred to, it is merely necessary to set the plug 42 in the hole in the casing corresponding with the voltage of the circuit, and thereafter to apply the contact blades 49 and 50 to the circuit in accordance with the particular test being made, and in accordance with the well known rules of lamp testing, whereupon the presence or absence of light within the lamps 18 and 19, and, if present, the degree of visibility thereof, will indicate, in the usual well known manner, the condition of the part or parts being tested.

I claim as my invention:

1. The combination of a casing, a resistance coil, an electrical conducting bar electrically connected to one end of the coil, a plurality of terminal contact parts electrically connected to the coil at different distances from the end thereof connected to said bar, means adjustable to different positions on said bar to electrically connect it to any one of said parts, a terminal electrical conductor leading from one end of said coil, and a terminal electrical conductor including a testing lamp leading from the other end of said coil.

2. The combination of a casing, a plurality of yielding contact parts, means to support the contact parts within the casing electrically insulated from each other, a resistance coil within the casing, an electrical conducting bar having a plurality of spaced openings therein corresponding in number with and positioned opposite to said contact parts and being supported within the casing and electrically connected to one end of the coil, said contact parts being electrically connected to the coil at different distances from the end thereof connected to said bar, and a plug adapted to be inserted into any one of said openings and when so inserted to electrically connect said bar with the contact part corresponding with the opening into which the plug is inserted, a terminal electrical conductor leading from one end of said coil, and a terminal electrical conductor including a testing lamp leading from the other end of said coil.

3. The combination of a casing, a plurality of yielding contact parts, means to support the contact parts within the casing electrically insulated from each other, a resistance coil within the casing, an electrical conducting bar having a plurality of spaced, screw-threaded openings therein corresponding in number with and positioned opposite to said contact parts and being supported within the casing and electrically connected to one end of the coil, said contact parts being electrically connected to the coil at different distances from the end thereof connected to said bar, and a screw-threaded plug adapted to be screwed into any one of said openings to electrically connect said bar with the contact part corresponding with the opening receiving the plug, a terminal electrical conductor leading from one end of said coil, and a terminal electrical conductor including a testing lamp leading from the other end of said coil.

4. The combination of a casing having a plurality of spaced openings in a wall thereof, a resistance coil within the casing, a testing lamp within the casing, a terminal electrical conductor connected to one end of the coil and extending through the casing to the exterior thereof, a second terminal electrical conductor extending from the interior to the exterior of the casing, and a connecting plug adapted to be inserted into any one of said openings and provided with means to electrically connect the last named conductor to the coil at different distances from the end thereof connected to the first named conductor, said distances being governed by said openings, said casing having an opening therein through which the lamp may be seen and the lamp being included in one of the terminal electrical conductors.

5. The combination of a casing having a plurality of spaced openings in a wall thereof, a resistance coil within the casing, a testing lamp within the casing, a member of insulating material supported within the casing and carrying a plurality of contact parts, an electrical conducting bar supported within the casing between said wall and said member and connected to one end of said coil and having a plurality of openings therein in alinement with said contact parts and the openings in said wall, said contact parts being electrically connected to the coil at different distances from the end thereof connected to said bar, a connecting plug adapted to be inserted into any one of the openings in said wall pass through the alined opening in said member and electrically connect the member with the alined contact part, a terminal electrical conductor connected to one end of the coil and extending through the casing to the exterior thereof, and a terminal electrical conductor connected to the other end of the coil and extending through the casing to the exterior thereof, said casing having an opening therein through which the lamp may be seen and the lamp being included in one of the terminal electrical conductors.

In testimony whereof I affix my signature hereto.

GEORGE W. WEIFORD, Jr.